US012304597B2

(12) United States Patent
Walpurgis (10) Patent No.: US 12,304,597 B2
(45) Date of Patent: May 20, 2025

(54) WATERCRAFT

(71) Applicant: CAYAGO TEC GmbH, Bad Salzuflen (DE)

(72) Inventor: Hans-Peter Walpurgis, Bad Salzuflen (DE)

(73) Assignee: CAYAGO TEC GmbH, Bad Salzuflen (DE)

( * ) Notice: Subject to any disclaimer, the term of this patent is extended or adjusted under 35 U.S.C. 154(b) by 0 days.

(21) Appl. No.: 17/766,752

(22) PCT Filed: Sep. 2, 2020

(86) PCT No.: PCT/EP2020/074383
§ 371 (c)(1),
(2) Date: Apr. 6, 2022

(87) PCT Pub. No.: WO2021/069148
PCT Pub. Date: Apr. 15, 2021

(65) Prior Publication Data
US 2023/0242220 A1    Aug. 3, 2023

(30) Foreign Application Priority Data
Oct. 10, 2019    (DE) .................. 10 2019 127 224.6

(51) Int. Cl.
*B63B 32/10*    (2020.01)
*A63B 35/12*    (2006.01)
(Continued)

(52) U.S. Cl.
CPC .............. *B63B 32/10* (2020.02); *A63B 35/12* (2013.01); *B63B 32/20* (2020.02); *B63B 32/57* (2020.02); *B63B 32/59* (2020.02); *B63H 11/08* (2013.01)

(58) Field of Classification Search
CPC ............................... B63H 11/08; A63B 35/12
See application file for complete search history.

(56) References Cited

U.S. PATENT DOCUMENTS 10,227,122 B2 *  3/2019  Walpurgis .............. B63H 23/00
11,447,210 B2     9/2022  Walpurgis
(Continued)

FOREIGN PATENT DOCUMENTS

CN        1955069 A      5/2007
CN      105008219 A     10/2015
(Continued)

OTHER PUBLICATIONS

International Search Report for corresponding patent application No. PCT/EP2020/074383, dated Dec. 9, 2020, 11 pages (not prior art).

(Continued)

*Primary Examiner* — S. Joseph Morano
*Assistant Examiner* — Jovon E Hayes
(74) *Attorney, Agent, or Firm* — Lucian Wayne Beavers; Patterson Intellectual Property Law, PC (57) ABSTRACT

A watercraft has a hull which, in the area of the deck, has a support on which parts of the upper body of a user can rest and where the user can hold on to handles. A flow channel is defined on the hull and a propelling screw is disposed in the flow channel. The flow channel has an intake port and, downstream of the propelling screw, a jet outlet in the stern area. A support body is disposed on the stern area in such a way that the support body extends the support by means of its support surface. In such a watercraft, a considerable increase in traveling speed can be achieved if provision is (Continued)

made for at least one sliding surface to be provided on the underside of the support body and for the support body to be rigidly connected to the hull.

21 Claims, 6 Drawing Sheets

(51) Int. Cl.
  *B63B 32/20* (2020.01)
  *B63B 32/57* (2020.01)
  *B63B 32/59* (2020.01)
  *B63H 11/08* (2006.01)

(56) References Cited

U.S. PATENT DOCUMENTS

| | | | |
|---|---|---|---|
| 2015/0064994 A1* | 3/2015 | Woods | B63B 1/04 114/61.31 |
| 2015/0232160 A1* | 8/2015 | Robinson | B63C 11/205 441/135 |
| 2015/0353175 A1* | 12/2015 | Walpurgis | A63B 35/12 114/315 |
| 2021/0001960 A1* | 1/2021 | Walpurgis | B63B 34/10 |

FOREIGN PATENT DOCUMENTS

| | | | |
|---|---|---|---|
| CN | 107406134 A | 11/2017 | |
| DE | 102015100497 A1 | 7/2016 | |
| DE | 102018104431 A1 | 8/2019 | |
| EP | 2078670 A1 | 7/2009 | |
| JP | 05278678 A | 10/1993 | |
| JP | 2003024470 A * | 1/2003 | ............ B63B 32/10 |
| WO | 2019166496 A1 | 9/2019 | |

OTHER PUBLICATIONS

Office Action for corresponding patent application No. DE 10 2019 127 224.6, dated Jul. 7, 2020, 8 pages (not prior art).
Brazil Office Action for corresponding patent application No. BR112022006554, dated Apr. 15, 2024, 4 pages (not prior art).
China Office Action for corresponding patent application No. 2023102600013660, dated Oct. 26, 2023, 7 pages (not prior art).
Korea Office Action for corresponding patent application No. 10-2022-7015542, dated Jan. 10, 2025, 9 pages (not prior art) (An English language translation—9 pages).

* cited by examiner

WATERCRAFT

The invention relates to a watercraft having a hull which, in the area of the deck, has a support on which parts of the upper body of a user can rest and where the user can hold on to handles preferably disposed in the bow area, wherein a flow channel is assigned to the hull or the hull has a flow channel, wherein a propelling screw is disposed in the flow channel, wherein the flow channel has an intake port and, downstream of the propelling screw, a jet outlet in the stern area, and wherein a support body is disposed on the stern area in such a way that the support body extends the support by means of its support surface.

Such a watercraft is known from DE 10 2018 104 431. This watercraft forms a towing vehicle to which a water board is connected in the stern area via an articulated connection. The water board extends the support surface of the watercraft. Accordingly, the upper body of the user lies partly on the watercraft and the remaining body area lies on the water board. In this way, the flow resistance the user's body presents to the flowing water is at least partially eliminated.

The invention addresses the problem of providing a watercraft of the type mentioned at the beginning, which can be used to significantly increase the traveling speed.

This problem is solved in that there is at least one sliding surface on the underside of the support body, and in that the support body is rigidly connected to the hull.

The rigid connection prevents the relative motion of the support body with respect to the watercraft in such a way that the support body can no longer buckle in the area where it is connected to the watercraft. It has been shown that such a rigid connection can significantly reduce flow resistance, especially during dynamic water travel. In this way, a sliding surface provided on the underside of the support body can be used to transfer the watercraft from displacement travel to sliding travel in a flow-optimized manner. This results in significantly increased traveling speeds.

Preferably, the support body is designed such that, when attached to the watercraft, its extension in the direction of the central longitudinal axis of the watercraft oriented in the direction of travel is at least 30% to 50%, preferably at least 50% to 70%, more preferably at least 70% of the length of the watercraft. For at least 30% to 50%, good maneuverability of the watercraft is maintained. For at least 50% to 70%, considerable speed increases are already possible. Significant speed increases are possible above 70%. Experiments by the inventors have shown that in some cases the traveling speed was more than doubled compared to the basic speed of the watercraft without a support body.

According to a preferred embodiment of the invention, provision may be made for the support body to be interchangeably connected to the hull. In this way, the watercraft can be operated in two modes of use. In the first type of use, without the support body attached, a reduced traveling speed is accompanied by good dynamic maneuverability. In the second type of use, with attached support body, especially fast travel over water can be implemented. The user thus has the option of setting up the watercraft according to the intended use. This measure also makes for improved transport, as the support body can be dismantled to save space for transport purposes.

According to one variant of the invention, provision may also be made for the support body to be firmly connected to the watercraft, in particular coupled integrally to the hull.

If a detachable connection is provided between the watercraft and the hull, then it has been found that it is particularly advantageous if an interchange coupling is operative between the hull and the support body. The interchange coupling can be used to interchangeably connect the support body to the hull. The user can use this coupling connection to easily attach or detach the support body to switch between the individual operating modes.

In this context, it is advantageous if, in addition, provision is made for the interchangeable coupling to have one or several projections, which are inserted into one or more retaining mounts of the other connecting partner (hull or support body). In this way, a particularly rigid and stiff connection between the watercraft and the support body can be achieved. The projections, which engage in the retaining mounts, permit the reliable transfer of the bending stresses to the connection area.

If provision is made for two spaced-apart section segments, which are inserted into plug-in mounts of the hull or support body, to protrude from the hull or support body, then the hull or support body can simply be plugged onto the watercraft. Transverse forces can be reliably transferred via the spacing of the hollow section segments. Of course, the protruding section segments can be disposed not on the support body, but alternatively on the watercraft, for them to engage with holding mounts, in particular plug-in mounts of the support body. However, if the hollow section segments are provided on the support body, they will not interfere with the use of the watercraft when the support body has been removed. Additionally or alternatively, provision may also be made for the section segments to be dismantled or that a swivel connection or sliding connection is provided between the watercraft or the support body and the section segment, to stow away the section segments in a space-saving manner. However, this may not compromise the rigid connection between the watercraft and the support body.

Preferably, however, provision is made for the section segments to protrude from the support body and be firmly connected thereto. Then they do not interfere with the watercraft when the support body has been removed. The section segments, which are firmly connected to the support body, make for a particularly rigid coupling to the watercraft.

Within the scope of the invention, it should also be possible, in particular, for the rigid connection between the hull and the support body to be designed in such a way that, apart from manufacture-related tolerances, no rotational motions and/or no translational motions occur between the hull and the support body. In particular, the rigid connection shall be such that no degrees of freedom are permitted between the watercraft and the support body in the connection area.

According to a preferred variant of the invention, provision may be made for the jet outlet of the flow channel to be disposed in such a way that the water jet generated by the propelling screw is guided past the underside of the support body, in particular guided along the underside of the support body. This permits a particularly flow-optimized design, which can be used to further increase the traveling speed.

A conceivable alternative invention is such that there is a depression on the underside of the support body, which depression is designed in such a way that it partially takes in and guides the water jet during vehicle operation. In this way, a low overall height for the support body can be achieved. It has also been shown that guiding the water jet in the depression can result in a further increase in performance. It has also proven advantageous if provision is made for the depression to extend from the connection area of the support body to the stern area of the hull in the direction of the end facing away from the bow area and to taper off in the area of the underside of the support body.

If provision is made for sliding surfaces to be disposed on both sides of the central longitudinal axis of the support body, which sliding surfaces are preferably angled relative to one another and which are particularly preferably designed at least sectionally as concave surfaces or at least sectionally as flat surfaces, then a rapid change from displacement travel to sliding travel can be realized. The sliding surfaces extend in the direction of the central longitudinal axis of the support body. Preferably, the sliding surfaces are disposed to merge directly or indirectly with flow surfaces of the watercraft. The design should be such that the sliding surfaces either merge with the flow surfaces of the watercraft without a shoulder or that a descending shoulder is created in the direction of travel. In that way, the water flow is not impeded by any flow resistance. The fact that the sliding surfaces are angled relative to one another renders stabilizing the driving operation possible.

According to the invention, provision may also be made for the hull to have water guidance surfaces in the area of the bottom hull, which water guidance surfaces extend along the central longitudinal axis extending from the bow area towards the stern area, and that the water guidance surfaces in the stern area have transition areas, which are transitioned into the sliding surfaces of the support body. Preferably, the transition areas are designed to be streamlined, for instance as convex curves.

If provision is made for the hull to have bilateral projections, which are disposed in the stern area, for the support body to be delimited by lateral edges in the direction of the central longitudinal axis, and for the projections to project transversely to the central longitudinal axis of the hull beyond the lateral edges, at least in the connection area, then the lateral connection areas of the support body to the watercraft are designed in a flow-optimized manner and disturbing flow resistances, which in particular can generate water spray, are prevented in this area in that way.

Particularly preferably, provision can also be made in this case for the projections to at least partially form the water guidance surfaces. In this way, the protrusions can be used to widen the water guidance surfaces, supporting the sliding properties in that way.

One conceivable alternative invention is of the type that in addition to the flow channel, a flooding compartment is disposed in the hull, which can be filled with water during water travel via water inlet openings using the surrounding water. When the watercraft is placed in the water, the flooding compartment fills with water. In this way, the buoyancy of the watercraft can be influenced. When the watercraft is removed from the water, the water runs out of the flooding compartment through the water intake openings. This then reduces the transport weight of the watercraft. The result is a simple system that can be used to easily adjust the buoyancy of the watercraft.

If provision is also made for the flooding compartment, in addition to the water inlet openings, to also be connected to the environment via water outlet openings in such a way that water is passed through the flooding compartment during water travel and an electrical unit held therein is cooled, then the flooding chamber can be used for the effective cooling of the electrical units. Unlimited quantities of flowing water are available for cooling purposes.

A watercraft as defined in the context of the invention, has in particular an electric motor that drives the propelling screw directly or indirectly. The electric motor is driven by one or several accumulators. Furthermore, a control unit is provided. It controls the functions of the watercraft.

One or several of the aforementioned components (electric motor, accumulator, control unit) can be accommodated at least sectionally in the flooding compartment for cooling purposes.

A possible invention design is such that a bulge is provided on the bottom hull, which forms the flow channel or covers it, and that the water guidance surfaces are disposed on both sides of this bulge. This results in a space-saving design and a particularly favorable inflow to the water guidance surfaces.

Additionally or alternatively, provision can also be made for one or several stabilizing fins to be disposed in the area of the bulge. These stabilizing fins help to stabilize the driving operation. At the bulge, they are far away from the central longitudinal axis of the watercraft. In this way, they can develop their stabilizing properties properly.

According to the invention, provision can also be made for the support body to be formed from a molded body, the core of which consists of foamed plastic material, and that this core is coated with a hard plastic layer. For instance, the core may be made of PU foam. The sheathed plastic layer can be formed from PUR, for instance.

Figure 1:
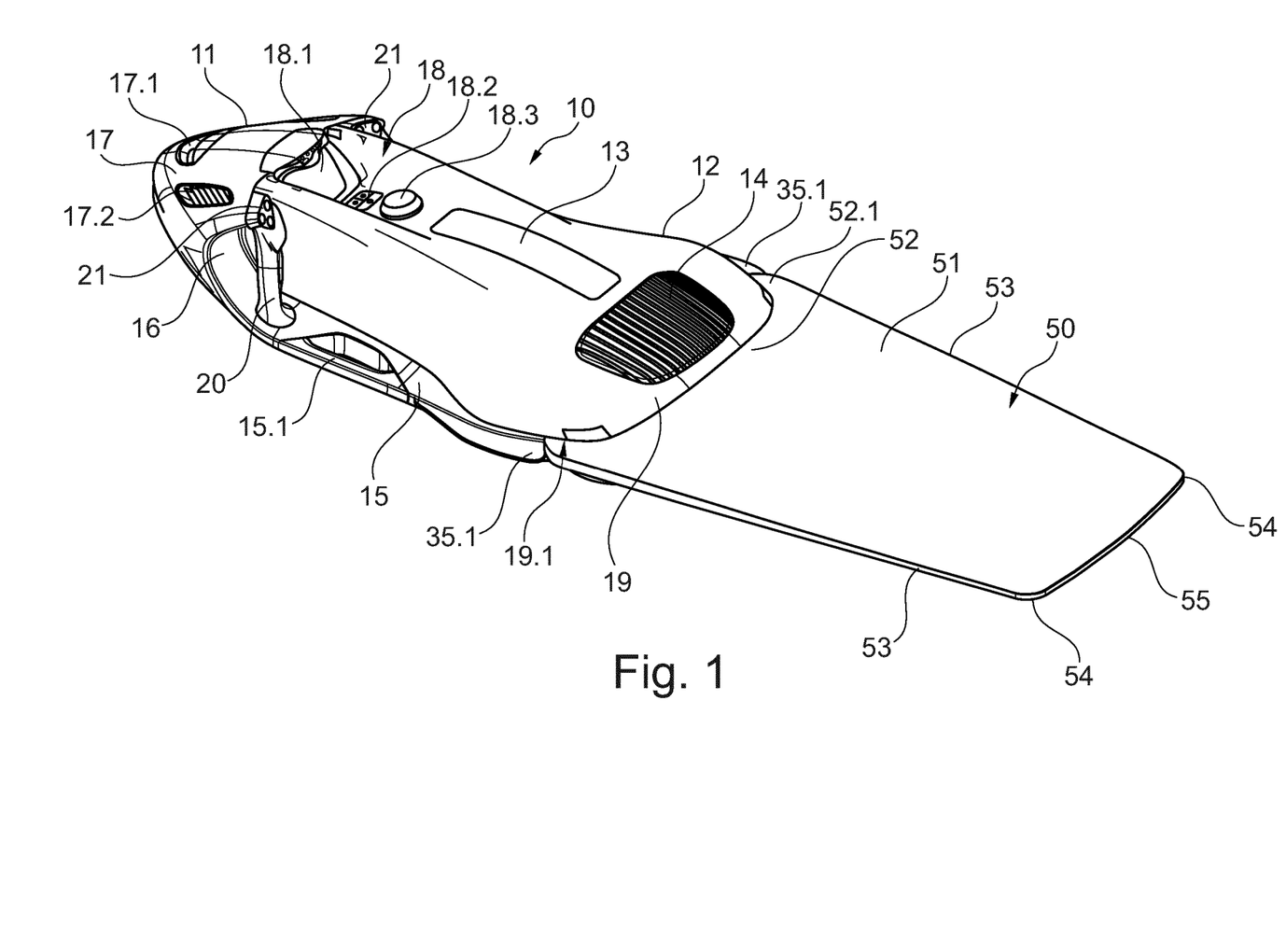
FIG. 1 shows a perspective view of a watercraft with a support body from the rear.

The invention is explained in greater detail below based on an exemplary embodiment shown in the drawings. In the Figures:

FIG. 1 shows a watercraft 10, which, in the context of the invention, can be used for submersible travel and for surface travel.

The watercraft 10 has a hull with a bow area 11 and a stern area 12. The hull of the watercraft 10 houses an electric motor and one or several rechargeable batteries. The rechargeable batteries supply power to the electric motor.

As FIG. 1 shows, the watercraft of 10 has a deck 13. The deck 13 forms a support surface. An area of the upper body of the user can lie thereon. Handles 20 are laterally provided in the area of the deck 13. The user can hold on to these handles Control elements 21 can be assigned to the handles 20. These control elements 21 can be used to control functionalities of the watercraft 10. For instance, the control elements 21 may be such that the power output of the electric motor can be controlled. Further functionalities can also be assigned to the control elements 21. For instance, these may be used to program a controller of the watercraft 10. It is also conceivable to use the control elements 21 to control other functions of the watercraft 10.

Armrests 15 are provided adjacent to the handles 20. The user can comfortably rest his forearms thereon. Carrying handles 15.1 may also be provided on either side of the watercraft 10 in the area of the arm rests 15. However, this is not absolutely necessary. Rather, it is also conceivable not to use such carrying handles 15.1, in which case water guidance surfaces may be disposed or continued in the area of the bottom hull 30 of the watercraft 10 in the area below the arm rests 15.

As FIG. 1 shows, the handles 20 can be disposed in a streamlined manner in the area of a handle recess 16 behind a nose 17 of the watercraft 10.

The nose 17 is located in the bow area 11 of the watercraft and may be designed independently of the handle recess 16. The nose 17 tapers streamlined toward the front of the watercraft. As the drawings indicate, it is conceivable that a headlight 17.1 is integrated into the hull of the watercraft at the front in the area of the nose 17. Additionally or alternatively, a camera may also be provided on the nose 17. The camera can be used to record videos, which is especially advantageous during an underwater trip.

A flooding compartment is integrated into the hull of the watercraft 10. This flooding compartment is connected to the environment via water inlet openings 17.2 and further water inlet openings 31, which are disposed in the area of the bottom hull and which are clearly visible in FIGS. 2, 4 and 5.

One or several of the aforementioned electrical units may be installed in the flooding compartment for cooling purposes. The flooding compartment may continue to be connected to the environment by means of a water outlet 14.

When the watercraft 10 is placed in the water, water from the environment flows through the water inlet openings 17.2, 31 into the flooding compartment and also initially through the water outlet opening 14. When the watercraft 10 is placed in drive mode, water through the water inlet openings 17.2, 31 flows into the flooding compartment. Then the water flows through the flooding chamber and it leaves the flooding compartment through the water outlet opening 14.

In this way, a water flow is generated in the flooding compartment during travel operation. This water flow can be used to continuously cool the electrical assembly or assemblies held therein.

If water inlet openings 17.2 are provided in the area of the deck 13, they can be used to cause the air in the flooding compartment to be displaced therefrom as the water flows in through other water inlet openings 17.2, 31.

If the water inlet openings 31 are provided in the area of the bottom hull 30, then a continuous water supply is guaranteed during driving operation.

FIG. 1 further shows that there is an indentation 18 in the area of the deck 13. This indentation 18 is located between the handles 20. The indentation 18 accommodates a display 18.1. The user can check operating parameters during water travel on this display 18.1. The aforementioned control elements 21 can also be used to switch between different display states of the display 18.1.

In addition or alternatively, further elements 18.2 can also be provided on the deck 13, preferably in the area of the indentation 18. These elements 18.2 may also be used to control functionalities of the watercraft 10. Preferably, these elements 18.2 can also be used to control the function of the display and their display states A charging plug is provided in the area of the deck 13. A cover element 18.3 can be used to seal the charging plug in a watertight manner. The charging plug can be used to connect the accumulators to a power supply for charging.

Figure 2:
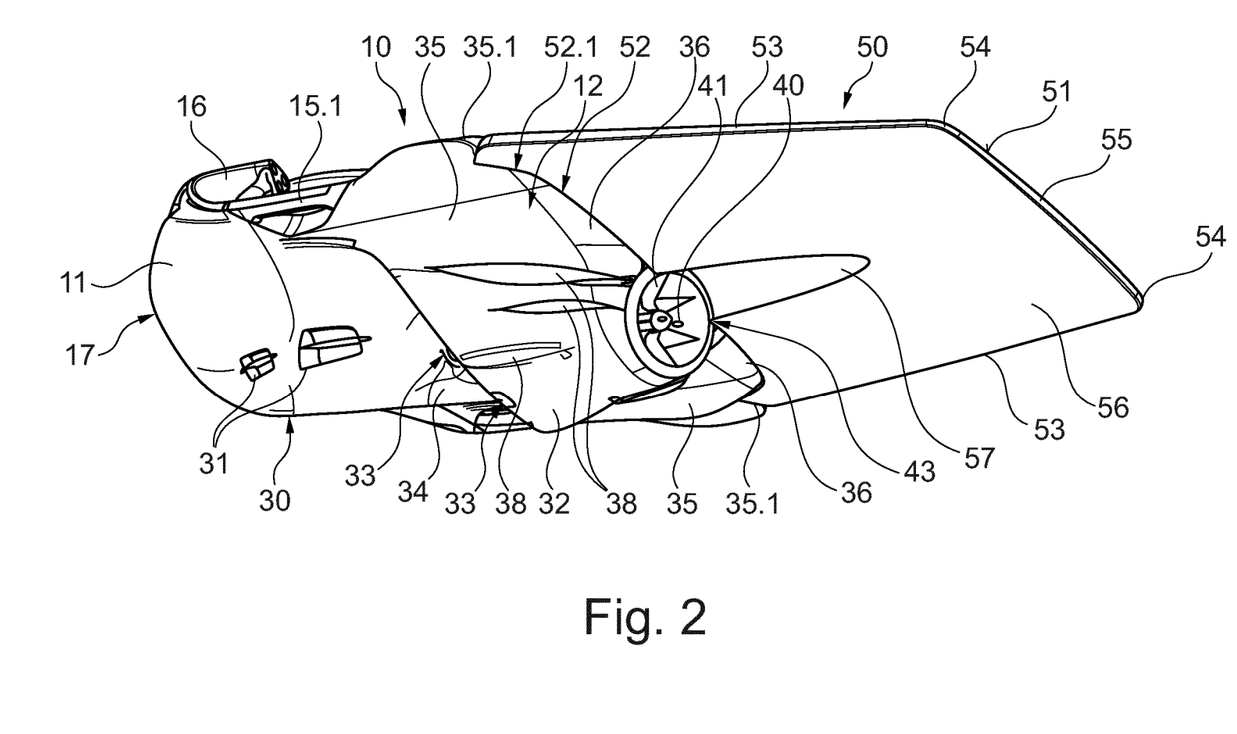
FIG. 2 shows a perspective view of the watercraft from below with attached support structure according to FIG. 1.
Figure 3:
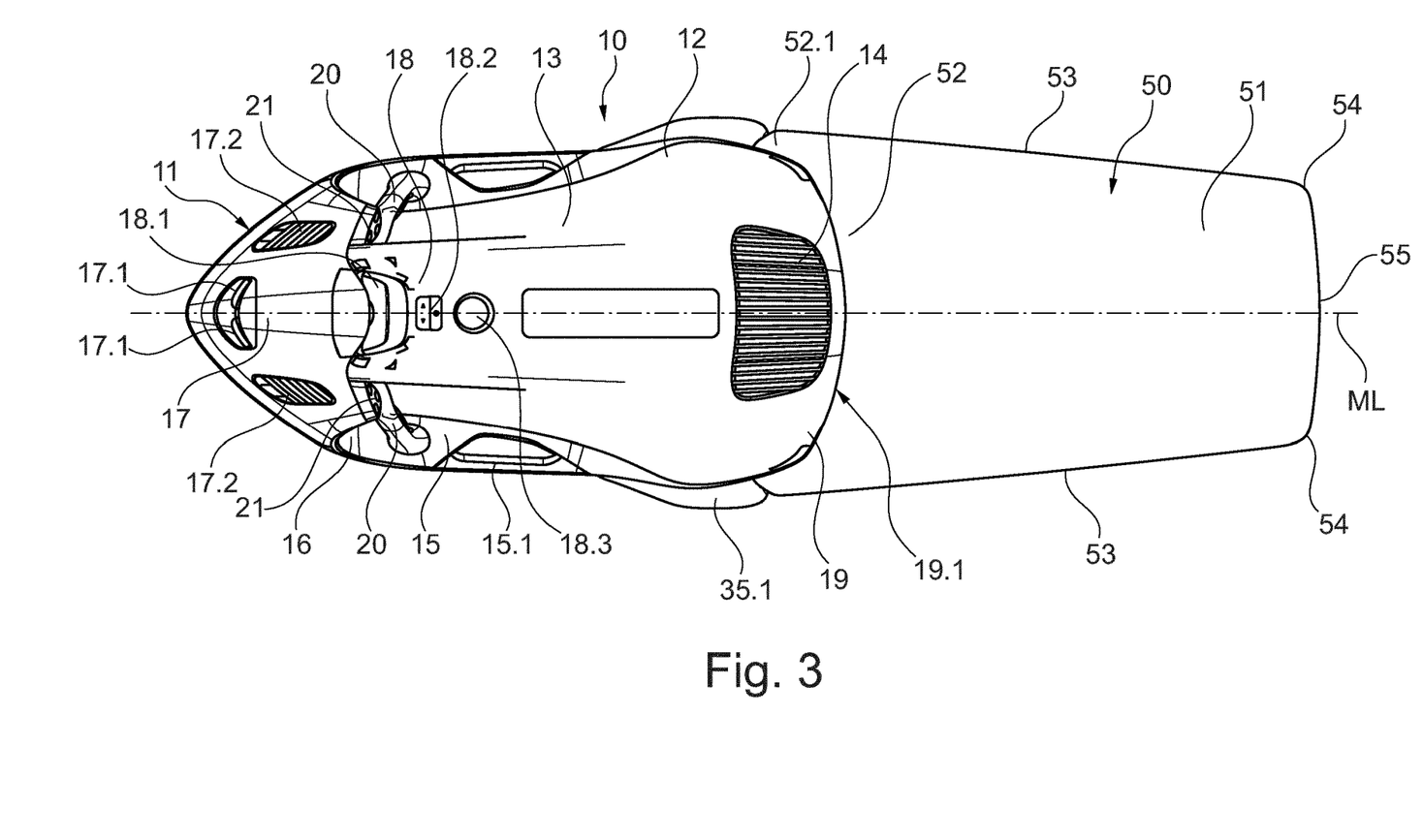
FIG. 3 shows a top view of the unit in accordance with FIGS. 1 and 2.
Figure 4:
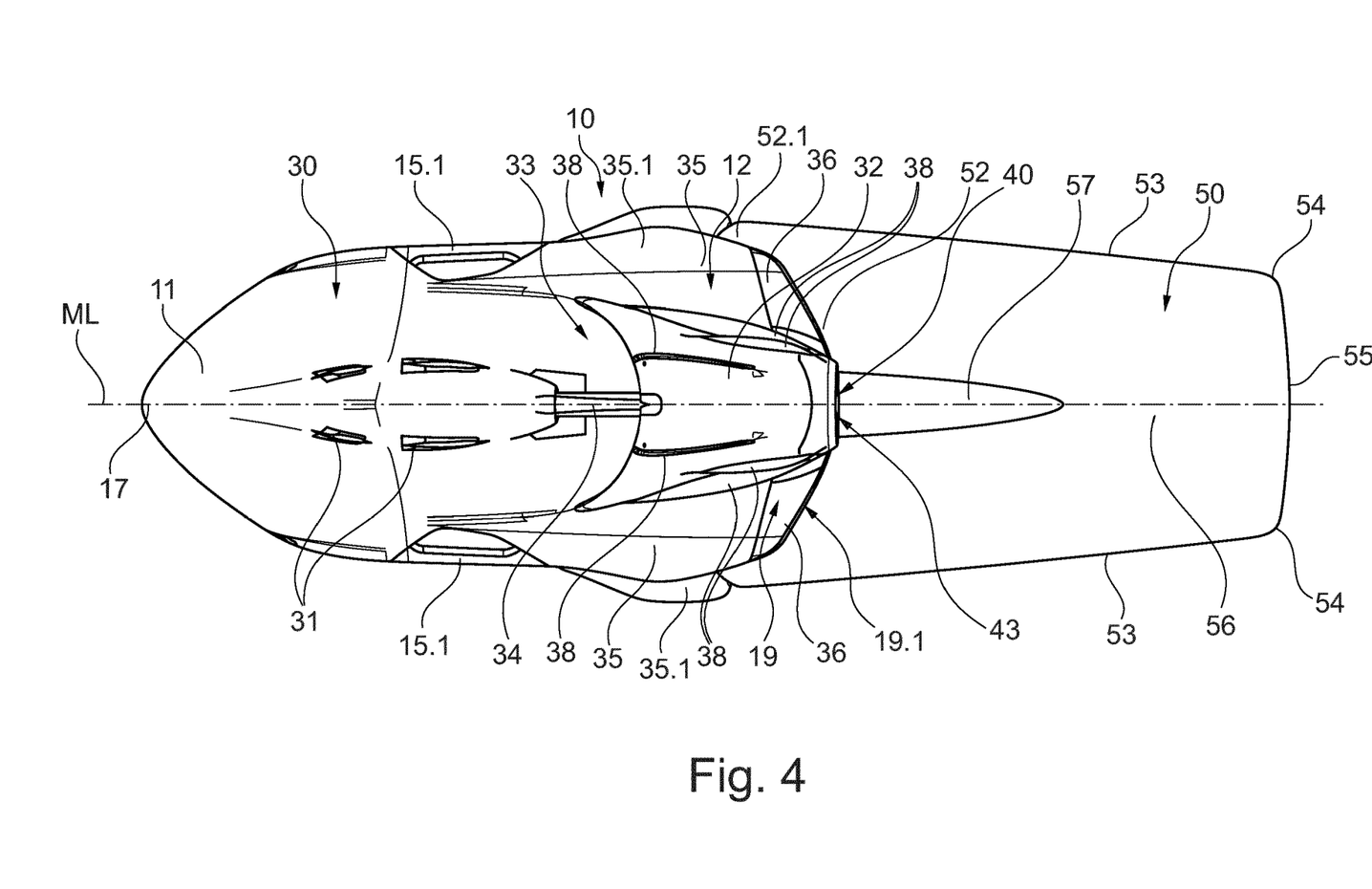
FIG. 4 shows a bottom view of the unit in accordance with FIGS. 1 and 2.

FIGS. 2 and 4 show the design of the bottom hull 30. These illustrations clearly show the water inlet openings 31 on the underside of the watercraft 10.

A flow channel 40 is disposed within the hull of the watercraft 10. A propelling screw 41 is located in the flow channel 40. The electric motor drives the propelling screw 41, which is also housed in the hull.

Figure 5:
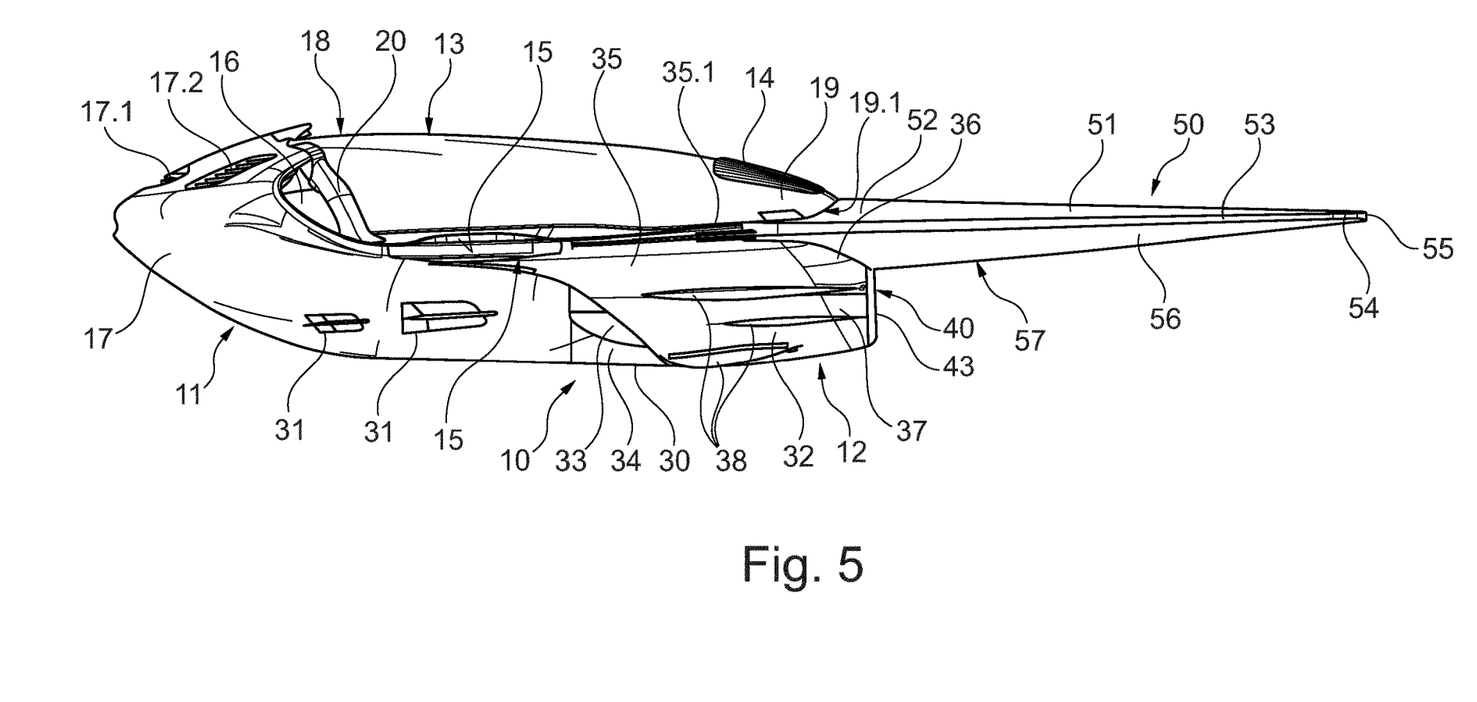
FIG. 5 shows a side view of the unit in accordance with FIGS. 1 and 2.

The flow channel 40 has an intake port 33. This intake port 33 is located in the area of the underside of the watercraft 10 and preferably amidships, as shown in FIG. 5. The intake port 33 is generously dimensioned. To mechanically stabilize this intake port, a stabilizing element 34 is used which, having the form of a sword, supports the radially outer area of the flow channel 40 relative to the hull. As can be seen in FIG. 2, inflow areas of the intake port 33 are formed at the side of the stabilizing element 34.

The watercraft 10 has a bulge 32 in the area of its bottom hull 30, which can be clearly seen in the drawings. This bulge 32 accommodates the flow channel 40.

FIG. 2 shows that the watercraft 10 has water guidance surfaces 35 laterally of the bulge 32. The water guidance surfaces thus extend on both sides of the flow channel 40.

As shown in the drawings, the water guidance surfaces 35 can be continuously continued in guidance surfaces of the bottom hull 30, which extend in front of the intake port 33. Preferably, these guidance surfaces merge steadily into the water guidance surfaces 35.

To be able to dimension the water guidance surfaces 35 to cover as large an area as possible, lateral projections 35.1 are provided on the hull. The water guidance surfaces 35 extend along these lateral projections 35.1.

Towards the rear, the water guidance surfaces 35 merge into transition areas 36. These transition areas 36 may be formed, for instance, as convex bulges.

As the drawings indicate, a support body 50 may be attached to the watercraft 10. The support body 50 may be rigidly connected to the watercraft 10. This means that the support body 50 cannot be bent with respect to the watercraft in the direction of the image plane according to FIG. 5. Particularly preferably, the connection of the support body 50 to the watercraft 10 is such that the support body cannot be displaced either translationally or rotationally in the connection area to the watercraft 10 (within manufacturing tolerances) relative to the watercraft 10.

The support body 50 may be either interchangeably or rigidly connected to the watercraft 10.

At its topside, the support body 50 forms a support surface 51. This support surface 51 is immediately adjacent to the deck 13 of the watercraft 10. In this way, the support surface of the watercraft 10, on which the user can rest, is extended and is the sum of the support surfaces of the deck 13 and the support surface 51 of the support body 50.

Figure 6:
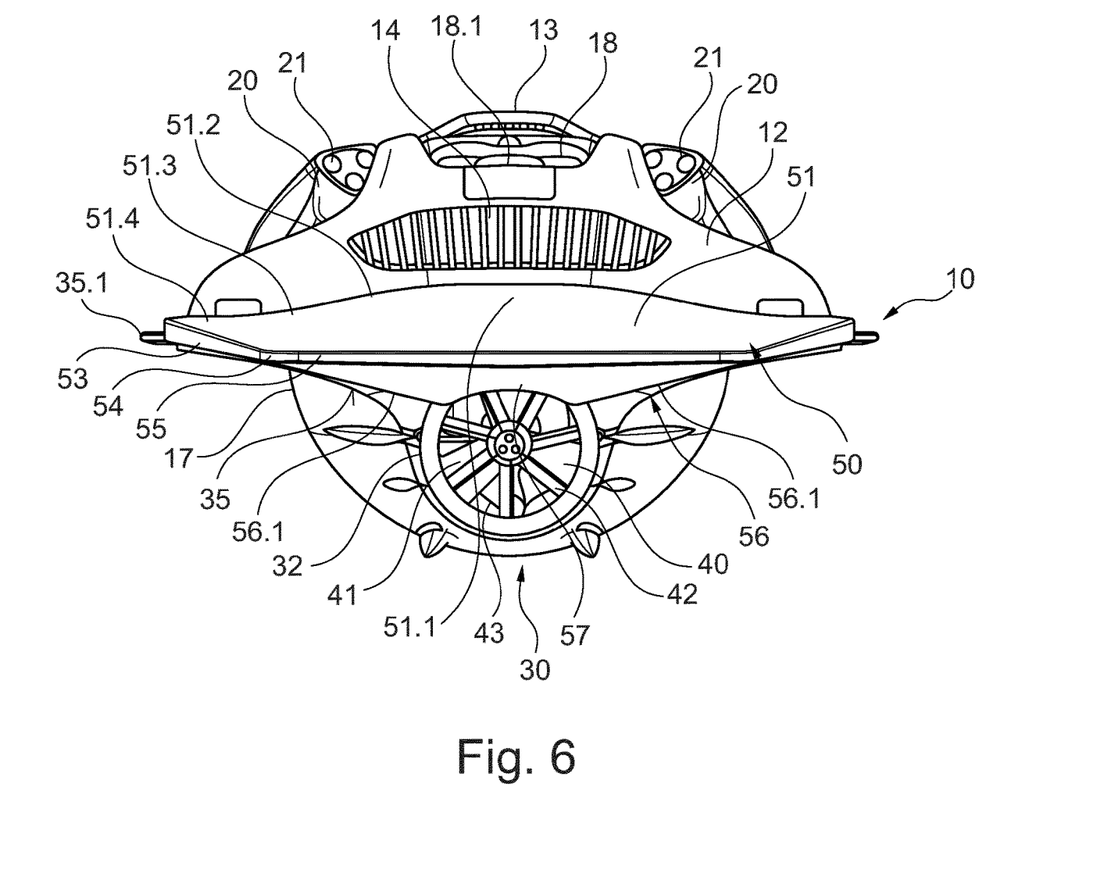
FIG. 6 shows a rear view of the unit in accordance with FIGS. 1 to 5.

FIG. 6 shows the design of the support surface 51 in more detail. As can be seen from this drawing, the support surface 51 is curved upwards. For this purpose, provision may be made, for instance, for the support surface 51 to have a raised central area 51.1. Lateral sections 51.3 adjoin this central area 51.1 via transition sections 51.2. The transition sections 51.2 can, for instance, be designed as convex curves for resting comfortably. The lateral sections 51.3 reduce the cross-section of the support body 50 to the lateral areas of the support body 50 extending transversely to the central longitudinal axis ML.

There is a mounting section 19 in the stern area 12 of the hull of the watercraft 10. The attachment section 19 has a plug-in mount 19.1, for instance. A support body 50 can be attached to the attachment section 19.

For instance, the support body may include a connection area 52, where it is coupled to the watercraft 10. To connect the support body 50 to the watercraft, for instance, two section segments, such as two pipe sections, may protrude from the support body 50 in the connection area 52. In this case, the longitudinal axes of these section segments extend in the direction of the central longitudinal axis ML of the watercraft 10. The section segments can be inserted into plug-in mounts of the watercraft 10. Here, the plug-in mounts also extend in the direction of the central longitudinal axis ML of the watercraft 10.

For instance, the plug-in mounts can extend in the area of the lateral projections 35.1. This generates a large support distance transverse to the central longitudinal axis ML.

To mount the support body 50, its section segments are inserted into the plug-in mounts. A suitable releasable locking device can then be used to prevent the support body 50 from being unintentionally pulled from the watercraft 10 again.

FIG. 4 clearly shows that lateral areas of the support body 50 are delimited by the lateral edges 53 extending in the direction of the central longitudinal axis ML. In this case, the lateral edges 53 extend in the direction of the central longitudinal axis ML in such a way that the width of the support body 50 decreases starting from the connection area to the watercraft 10. Preferably, the width of the support body 50 is continuously reduced in this manner. Provision is made for the width of the support body 50 to be reduced continuously and/or only sectionally.

The lateral edges 53 merge into a rear edge 55 of the support body 50 via rounded section 54.

In the connection area 52, an indenture 52.1, for instance, can be provided, which reduces the width of the support body 50 in the direction towards the nose area 11.

Particularly preferably, the arrangement of the support body 50 in the area of its connection to the hull is such that the lateral projections 35.1 cover the connection area 52 of the support body 52 transversely to the central longitudinal axis ML and thus transversely to the direction of travel of the watercraft 10.

FIGS. 2, 4 and 6 show that one or several sliding surfaces 56 may be provided on the underside of the support body 50. In this exemplary embodiment, two sliding surfaces 56 are provided in particular, which are angled relative to each other. This is clearly shown in particular in FIG. 6. This illustration shows the V-shaped angling of surface areas 56.1 of the sliding surfaces 56. The surface areas 56.1 can be flat surfaces or concave surfaces.

Starting from the connection area 52, a depression 57 is recessed in the underside of the support body 50. This depression 57 extends from the connection area 52 towards the free end of the support body 50. The depression 57 is located downstream of the jet outlet 43 of the flow channel 40. Accordingly, the water jet generated by the propelling screw 41 is directed past the underside of the support body 50. If the optional depression 57 shown in the drawings is used, this water jet is guided in the area of the depression 57 in a streamlined manner.

FIG. 6 shows that a flow stabilizer 42 is provided downstream of the propelling screw 51 in the flow channel 40. This flow stabilizer 42 is used to straighten the rotating flow of the water jet generated by the propelling screw 41 (in particular propeller) at least to a large extent. This results in a considerable increase in power.

The invention claimed is:

1. A watercraft, comprising:
a hull including a stern and a bow, the hull including a flow channel having an intake port and a jet outlet, and the hull including a deck including a support configured such that an upper body of a user can rest on the support;
a plurality of handles attached to the hull such that the user resting on the support may grip the handles;
a propelling screw disposed in the flow channel between the intake port and the jet outlet; and
a support body rigidly connected to the stern of the hull at a rigid connection, the support body including a support surface extending rearward from the support of the hull, the support body further including at least one sliding surface on an underside of the support body;
wherein the jet outlet of the flow channel is configured such that a water jet generated by the propelling screw is guided along the underside of the support body; and
wherein the underside of the support body includes a depression configured such that the depression partially takes in and guides the water jet during operation of the watercraft.

2. The watercraft of claim 1, wherein:
the support body is interchangeably connected to the hull.

3. The watercraft of claim 1, wherein:
the support body is integrally connected to the hull.

4. The watercraft of claim 1, wherein:
the support body is interchangeably connected to the hull by an interchange coupling.

5. The watercraft of claim 4, wherein:
the interchange coupling includes at least one projection on one of the support body and the hull, the at least one projection being received in at least one retaining mount of the other of the support body and the hull.

6. The watercraft of claim 1, wherein:
the support body is connected to the hull by two spaced apart plugs extending from one of the support body and the hull, the two spaced apart plugs being received in two plug-in mounts of the other of the support body and the hull.

7. The watercraft of claim 6, wherein:
the two plugs protrude from the support body and are fixedly connected to the support body.

8. The watercraft of claim 1, wherein:
the rigid connection of the support body to the stern of the hull is configured such that apart from manufacture-related tolerances no rotational motions or translational motions occur between the hull and the support body.

9. The watercraft of claim 1, wherein:
the depression extends rearward from adjacent the stern of the hull and the depression tapers rearwardly.

10. The watercraft of claim 1, wherein:
the at least one sliding surface includes first and second sliding surfaces disposed on opposite sides of a central longitudinal axis of the support body.

11. The watercraft of claim 10, wherein:
the first and second sliding surfaces are angled relative to one another.

12. The watercraft of claim 10, wherein:
the first and second sliding surfaces are at least partially concave or flat surfaces.

13. A watercraft, comprising:
a hull including a stern and a bow, the hull including a flow channel having an intake port and a jet outlet, and the hull including a deck including a support configured such that an upper body of a user can rest on the support;
a plurality of handles attached to the hull such that the user resting on the support may grip the handles;
a propelling screw disposed in the flow channel between the intake port and the jet outlet; and
a support body rigidly connected to the stern of the hull at a rigid connection, the support body including a support surface extending rearward from the support of the hull, the support body further including at least one sliding surface on an underside of the support body;

wherein the at least one sliding surface includes first and second sliding surfaces disposed on opposite sides of a central longitudinal axis of the support body; and wherein the hull includes a bottom hull including water guidance surfaces extending in a direction from the bow toward the stern, the water guidance surfaces including a transition adjacent the stern into the sliding surfaces of the support body.

14. A watercraft, comprising:

a hull including a stern and a bow, the hull including a flow channel having an intake port and a jet outlet, and the hull including a deck including a support configured such that an upper body of a user can rest on the support;

a plurality of handles attached to the hull such that the user resting on the support may grip the handles;

a propelling screw disposed in the flow channel between the intake port and the jet outlet; and a support body rigidly connected to the stern of the hull at a rigid connection, the support body including a support surface extending rearward from the support of the hull, the support body further including at least one sliding surface on an underside of the support body;

wherein the hull includes bilateral projections adjacent the stern;

wherein the support body is delimited by lateral edges; and wherein the bilateral projections project transversely to a central longitudinal axis of the hull beyond the lateral edges at least where the support body is connected to the stern of the hull.

15. The watercraft of claim 14, wherein:

the hull includes a bottom hull including water guidance surfaces extending in a direction from the bow toward the stern, the water guidance surfaces including a transition adjacent the stern into the at least one sliding surface of the support body; and the bilateral projections at least partially form the water guidance surfaces.

16. A watercraft, comprising:

a hull including a stern and a bow, the hull including a flow channel having an intake port and a jet outlet, and the hull including a deck including a support configured such that an upper body of a user can rest on the support;

a plurality of handles attached to the hull such that the user resting on the support may grip the handles;

a propelling screw disposed in the flow channel between the intake port and the jet outlet; and a support body rigidly connected to the stern of the hull at a rigid connection, the support body including a support surface extending rearward from the support of the hull, the support body further including at least one sliding surface on an underside of the support body;

wherein the hull includes a flooding compartment configured such that during travel of the watercraft in a body of water the flooding compartment can be filled with water via a plurality of water inlet openings to the body of water.

17. The watercraft of claim 16, wherein:

wherein the flooding compartment is also communicated to the body of water through a plurality of water outlet openings so that water is passed through the flooding compartment during travel of the watercraft in the body of water; and wherein the watercraft includes an electrical unit located in the flooding compartment so that the electrical unit may be cooled by water passing through the flooding compartment.

18. The watercraft of claim 1, wherein:

the hull has a central longitudinal axis running between the bow and the stern;

the plurality of handles includes at least one handle on each side of the central longitudinal axis; and the watercraft further includes a control element adjacent each handle.

19. A watercraft, comprising:

a hull including a stern and a bow, the hull including a flow channel having an intake port and a jet outlet, and the hull including a deck including a support configured such that an upper body of a user can rest on the support;

a plurality of handles attached to the hull such that the user resting on the support may grip the handles;

a propelling screw disposed in the flow channel between the intake port and the jet outlet; and a support body rigidly connected to the stern of the hull at a rigid connection, the support body including a support surface extending rearward from the support of the hull, the support body further including at least one sliding surface on an underside of the support body;

wherein the hull includes a bottom hull including water guidance surfaces extending in a direction from the bow toward the stern;

wherein the bottom hull includes a bulge and the flow channel is at least partially defined within the bulge; and wherein the water guidance surfaces are disposed on both sides of the bulge.

20. A watercraft, comprising:

a hull including a stern and a bow, the hull including a flow channel having an intake port and a jet outlet, and the hull including a deck including a support configured such that an upper body of a user can rest on the support;

a plurality of handles attached to the hull such that the user resting on the support may grip the handles;

a propelling screw disposed in the flow channel between the intake port and the jet outlet; and a support body rigidly connected to the stern of the hull at a rigid connection, the support body including a support surface extending rearward from the support of the hull, the support body further including at least one sliding surface on an underside of the support body;

wherein the hull includes a bulge on a bottom of the hull and the flow channel is at least partially defined within the bulge; and wherein the watercraft further includes at least one stabilizing fin defined on the bulge.

21. The watercraft of claim 1, wherein:

the support body is a molded body including a core of foamed plastic material, the core being coated with a hard plastic layer.

* * * * *

UNITED STATES PATENT AND TRADEMARK OFFICE
CERTIFICATE OF CORRECTION

| | | |
|---|---|---|
| PATENT NO. | : 12,304,597 B2 | Page 1 of 1 |
| APPLICATION NO. | : 17/766752 | |
| DATED | : May 20, 2025 | |
| INVENTOR(S) | : Hans-Peter Walpurgis | |

It is certified that error appears in the above-identified patent and that said Letters Patent is hereby corrected as shown below:

In the Specification

Column 4, Line 52 - add --20.-- to the end of the sentence

Signed and Sealed this
Twenty-fourth Day of June, 2025

Coke Morgan Stewart
*Acting Director of the United States Patent and Trademark Office*